United States Patent Office 2,919,996
Patented Jan. 5, 1960

2,919,996

AQUEOUS DISPERSIONS OF HIGH MOLECULAR WEIGHT FIBRILS OF AMORPHOUS SILICATES

Jayanti Dharma Teja, Whitestone, N.Y., assignor to Montecatini-Società Generale per l'Industria Mineraria e Chimica, Milan, Italy, a corporation of Italy No Drawing. Application April 26, 1957
Serial No. 655,166

2 Claims. (Cl. 106—74)

This invention relates to the preparation of aqueous solutions of polymeric silicates.

Heretofore it has been known that monomeric silicic acid could undergo condensation in aqueous acid to form generally spherical colloidal particles of polysilicic acid. Textbooks such as "The Colloidal Chemistry of Silica and Silicates" by R. Iler (Cornell V.P., 1955), "Physical Chemistry of Silicates" by Eitel (U. Chicago Press, 1952), "Light-Scattering in Physical Chemistry" by Stacey (Butterworth, 1956), "Silicic Science" by Hauser (Van Nostrand, 1955), and "Soluble Silicates" by G. G. Vail (Reinhold, 1952), each describe data indicating that acidic and neutral aqueous suspensions of polymeric silica consists of globular siliceous particles. The sodium silicates, potassium silicates and mixtures thereof are known as the alkaline silicates, and share together a variety of properties with which silicate chemists are familiar. Although the pH of an aqueous system might be above 7, and hence alkaline, and although such a system might contain dispersions of insoluble siliceous minerals, such a system would not be an alkaline silicate system, because such term embraces only materials closely related to water glass. Altho the possibility of linear polymerization of alkaline silicates has been recognized it has been believed that only moderate molecular weights were attainable, and that even these colloidal particles were globular instead of linear. Previous workers have described globular particles of 10,000 molecular weight in commercial alkaline silicate solutions but the average molecular weights of such silicate solutions have generally been less than 2000.

In accordance with the present invention aqueous systems containing linear polysilicates either having an average molecular weight greater than about 5,000 or containing significant amounts of colloidal particles having a molecular weight greater than 20,000 are prepared by the application of the control of the catalysts and polymerization conditions effective for achieving such linear (as distinguished from globular) polymerization.

One of the possible theories for explaining the beneficial results of the present invention is that specific distortion of the linear polysilicate unit favours the linear (as distinguished from globular) structure of silicate particles undergoing polymerization. By bringing about the polymerization of silicates in an alkaline aqueous system in the presence of appropriate catalysts, linear fibrils of polysilicate are formed. Some data relating to asbestos, endellite and other naturally-occurring siliceous materials possessing linearity, can be interpreted consistently with such theory.

This discovery that aqueous systems containing colloidal fibrils of linear polysilicate can be prepared clarifies the explanation of the methods of preparing glass fibers from aqueous systems as set forth in the applications of J. D. Teja, Ser. No. 511,132, filed May 25, 1955 (entitled Preparation of Mineral Fibers) and Ser. No. 526,779, filed August 5, 1955 (entitled Manufacturing Glass Fibers). This application is a continuation-in-part of said applications. The aqueous systems containing colloidal fibrils of linear polysilicate are believed to have usefulness in the protective coating, adhesives, and other arts apart from their usefulness in preparing glass fibers.

As explained in ancestor applications, Ser. Nos. 511,132 and 526,779, molybdena is not in the group of glass forming oxides recommended by glass technologists for glassmaking. Said Ser. No. 526,779 explains that it is sometimes preferable to select glass-forming oxides from the group consisting of boria, alumina, zirconia, titania, zinc oxide, calcium oxide, barium oxide, arsenic oxide, germania, hafnia, phosphoric oxide, vanadia, antimonia, lead oxide, thoria, berrylia, and tungstic oxide. In the glass making technology, the term "metal oxide" sometimes includes oxides of elements which some chemists would not designate as metals. Although the present invention is concerned with aqueous alkaline silicates, the terminology and classifications have been taken in part from some of the older classical textbooks on glass technology.

The technical subject matter pertinent to the present invention can be better understood by a consideration of sets of data, which are for convenience designated as a series of examples.

Because the prior art literature concerning aqueous compositions of compounds of silicon connotes that the larger particles resulting from polymerization in water are consistently of a globular structure, the persuasiveness of the evidence in support of the linear structure of the products of the present invention should be understood even before detailed consideration is given to the methods by which such products are prepared. Colloidal polysilicic acid solutions in water have been studied by light scattering techniques to measure both the turbidity molecular weights and the values of dissymmetry (Z).

Consideration can be given to publications such as Nauman and Debys, J. Phys. Chem. 55, 1–8 (1951), Iler et al., J. Phys. Chem., 57, 932 (1953), and Edsal, J.A.C.S., 75, 5058 (1953).

The values covering the whole range of turbidity molecular weights and values of dissymetry are shown in Table 1. It is to be noted that a (Z) value approaching 1.1 is necessary to estimate the value of a spherical particle as equivalent to approximately 300 Angstroms. Dissymmetry (Z) values of 1.1 are extremely unreliable in terms of the accuracy of the method of determining (Z), because a value of 1.1 may merely indicate that (Z) is very nearly equal to 1.

TABLE 1

[Turbidity mol. wts. and (Z) values for colloidal silica]

| Turbidity, Mol. wt. in millions | Particle diameter in Angstroms | (Z) Value |
|---|---|---|
| 3.8 | 175 | Approximately 1. |
| 8.3 | 230 | Approximately 1. |
| 19.5 | 300 | Approximately 1. |
| 54.0 | 430 | Approximately 1.1. |
| 100.0 | 530 | Approximately 1.1. |
| 210.0 | 660 | Approximately 1.15. |

In most light scattering work, carefully filtered solutions are employed. Such filtration of colloidal silica solutions provides data on particles having molecular weights in the range of approximately 4 million and a particle size less than 200 A. and a (Z) value equal to 1. The data on the 210,000,000 molecular weight, 660 A. diameter particles of colloidal silica were obtained using solutions purified, not by filtration, but by centrifuging techniques.

Both the prior art literature and the experimental work during the development of the present invention confirmed the absence of dissymmetry and the existence of the globular shape of the particles in a colloidal silica solution. Colloidal silica solutions are generally prepared under slightly acidic conditions, but after being prepared may be converted to alkaline aqueous systems containing such globular colloidal particles. In evaluating light scattering data, consideration must be given to the effects of various amounts on ions in the system being investigated.

Polyelectrolytes in ionizing solvents behave differently from non-electrolyte system. In tests upon polyacrylic acid, the conversion of the material to a polyelectrolyte resulted in a reduction of the intensity of the 90° light scattering to about 2% of the intensity with the non-ionized material. Under some conditions, there can be the anomalous observation of (Z) values less than 1.

Thus the molecular weight determinations of polyelectrolytes by turbidity methods can lead to apparent molecular weight determinations which are smaller than the real value. However, reliable measurements can be made by the turbidity methods in systems of high ionic strength.

The linear polysilicate systems of the present invention provide the high ionic strength necessary, and reliable, consistent data are obtained.

Aqueous solutions of sodium silicate have previously been studied by light scattering methods, as described for example in the previously cited Nauman and Debeye article. They worked with pure sodium silicates and obtained generally only stoichiometric molecular weights e.g. approximately 76.1 for the ion $SiO_3$. Only in very dilute solutions of less than 0.05 gm./cc. concentration of aged commercial tetrasilicate $Na_2O:SiO_2::1:3.9$ they found molecular weights up to 10,000. At higher concentrations above 0.1 mg./cc., silicates more alkaline than $Na_2O$; 2.0 $SiO_2$ have turbidities similar to sucrose. They detected no evidence of polymerization. The more siliceous solutions as stated above in course of aging develop larger particle sizes with molecular weights approaching 10,000. In all these cases studied (Z) values were not expressed because they are almost equal to 1.

Thus, prior art literature shows particles of sodium silicate having a molecular weight as high as 10,000, in alkaline solution having a globular shape. Such prior art findings are to be contrasted with the surprising results obtained by the present invention. Aqueous solutions prepared in accordance with the present invention were studied by light scattering methods, which proved that these solutions contained colloidal silicate particles of very high molecular weight and possessed such high (Z) values as to necessitate the conclusion that the polymeric silicate was linear instead of globular. These data are shown in Table 2.

TABLE 2

| Turbidity, mol. wts. | (Z) values |
|---|---|
| 10,000 | 1.3. |
| 33,000 | 1.65. |
| 100,000 | 2.8. |
| 350,000 | greater than 4.7. |
| 800,000 | greater than 5.2. |

For a spherical silicate particle in the system $Na_2O:3.75SiO_2$ a density of 0.43 was estimated (Vail and Will, vol 1, page 100).

The diameter of such a particle of molecular weight 800,000 cannot be more than 530 Angstroms by comparison with colloidal silica particles of density 2.2 and molecular weight $100 \times 10^6$ and diameter 530 Angstroms. The (Z) value for an aqueous system of such particles should be approximately 1.1 and not greater than 5.2. Such a high value for (Z) can only mean extended molecules linear in nature, especially in view of the evaluation of a polyelectrolyte system of high ionic strength. Using the value of approximately 4 Angstroms for the size of $Si(OH)_4$ unit in the systems, one obtains correlation with observed (Z) values and hence particle sizes if one theorises a rod particle of a small cross-section containing, on the average, 4 or more silicon tetrahedra linked together in the width and depth directions and hundreds of silicon tetrahedra joined in the length direction.

Accordingly, it is necessary to postulate fibrillar molecules in the polysilicate systems prepared in accordance with present invention.

Alkaline silicate material is converted to an aqueous system containing linear polymeric silicate by partially dehydrating the aqueous system in the presence of an appropriate, expendable catalyst selected from the group which excludes sodium oxide and potassium oxide, but includes all other metal oxides recommended by glass technologists for glass-making. The polymerization proceeds in part by a chain reaction of hydrogen ion transfer, particularly in the more alkaline aqueous solutions, and is, further, catalyzed by the metal ions, which fit within the linear polymer in such a manner that the polysilicate fibrils partake of the nature of colloidally dispersed glass.

The method of polymerization can be described generally as involving the following steps. The starting solution is an aqueous solution of the silicate of an alkali metal of the group consisting of sodium, potassium, and mixtures thereof in which solution the ratio of oxygen-containing compounds of the alkali metals to the oxygen-containing compounds of silicon is within the range from 1:2 to 1:5. This aqueous solution of alkaline silicate is then modified to prepare a mixture by incorporating catalytic amounts of at least one oxygen-containing compound of the group consisting of boron, aluminum, zirconium, titanium, zinc, calcium, barium, arsenic, germanium, hafnium, phosphorus, vanadium, antimony, lead, thorium, beryllium, and tungsten. Heat is applied to this mixture to cause water to evaporate from the surface thereof so as to concentrate the mixture. During this heating or concentrating step that portion of the body of the mixture closest to where the heat is applied is spaced somewhat from the surface of the mixture at which the evaporation takes place and maintained at a temperature significantly higher than said surface so that a film of heated mixture will thereby diffuse through the balance of the mixture toward the evaporative surface. The pH of the body of the mixture is maintained above 7 during this heating of the mixture, and the heating is continued until at least 10% of the initial water content of the mixture has been removed and until the solids content of the remaining composition has become at least 40% by weight. At this stage of the process the alkaline silicates in the mixture will have polymerized during the concentration of the aqueous system. This polymerization is predominantly linear by reason of the catalytic influence of the oxygen-containing modifiers, and consequently predominant amounts of amorphous, glass-like, non-crystalline fibrils are formed as solids in the aqueous system, and these solids have an average molecular weight, as measured by the light scattering method, of at least 10,000.

There are various specific modifications of this general method for polymerizing silicate, and the relative effectiveness of these various techniques is indicated in Table 3 below.

TABLE 3

| Solids content of aqueous system | Treatment | Turbidity, mol. wt. | (Z) dissymmetry |
|---|---|---|---|
| Na₂O.SiO₂ (1:3.4) | Refluxing for 12 hrs; with stirring; followed by rapid concentration in an open vessel (CO₂ present with stirring in air) to 45% solids. | 6,000-8,000 | 1.3 |
| Na₂O.SiO₂ (1:3.4) | Reflux 12 hrs; concentrate in vacuum to 45% solids. | less than 3,000 | 1.1 |
| Na₂O.SiO₂ (1:3.4): 5% colloidal silica | Reflux 12 hrs. with stirring; and heat in open vessel rapidly with stirring. Concentration to 45% solids. | 6,000-8,000 | 1.35 |
| Na₂O.SiO₂ (1:3.4): 5% colloidal silica, 3% H₃BO₃ | ___do___ | 18,000-30,000 | 1.6 |
| Na₂O.SiO₂ (1:3.4): 5% colloidal silica, 3% H₃BO₃, 2% Al₂O₃, 2% ZnO, 1% MgO. | ___do___ | 130,000 | 3.0 |
| Na₂O.SiO₂ (1:3.4): 3% H₃BO₃, 3% Al₂O₃, 2% MgO. | ___do___ | 50,000 | 1.9 |
| Na₂O.SiO₂ (1:3.4): 3% H₃BO₃, 3% Al₂O₃, 2% MgO, 5% colloidal silica. | ___do___ | 100,000 | 2.8 |

In the above table the sodium silicate is a 34 Bé.° solution, and the colloidal silica solution is a 30% solution.

The data of Table 3 shows: that the presence of air aids the attainment of higher molecular weights; that the presence of 5% boric acid (solids basis) catalyst can bring about a fivefold increase in the average molecular weight; that a multi-component catalyst helps to attain still higher molecular weights; and that the colloidal silica, although almost without effect by itself, promotes the activity of the multi-component catalyst; and that the higher molecular weight fibrils thus prepared have dissymmetry values establishing the linearity of the silicate molecules.

Although the data from light scattering studies provides the most persuasive evidence that linear polysilicates are formed in accordance with the present invention, a variety of other tests provide convincing confirmation of the result.

The viscosity of a solution of sodium silicates is known to remain constant and independent of the velocity gradient. The aqueous solutions of linear polysilicates of the present invention exhibit an enormous dependence on velocity gradient.

By a method employing velocity gradient dependence, employing various pressures and velocities and observing time of flow through standard capillary, viscometers and calculating back to zero rate of shear, the values of Table 4 were obtained for intrinsic viscosity (N) in standard units.

TABLE 4

| Sample | Turbidity molecular weights | Intrinsic Viscosity |
|---|---|---|
| 1 | 10,000 | 0.08 |
| 2 | 33,000 | 0.23 |
| 3 | 100,000 | 0.57 |
| 4 | 350,000 | 1.05 |
| 5 | 800,000 | 1.85 |

The solutions studied under a polarizing microscope forced flow through a capillary exhibited flow birefringence similar to fine sodium bentonite suspensions.

All such data confirm the existence of linear (as distinguished from globular) polysilicate particles in the aqueous systems of the present invention.

*Example*

Several manufacturers market aqueous solutions consisting essentially of water and colloidal silica in a concentration of about 30%. Any of the several brands of such solutions, which are sometimes briefly designated as 30% colloidal solutions, may be employed as the ingredient first used in preparing a paste having a catalytic effectiveness similar to the catalysts described in the fifth and seventh procedures of Table 3. A solution containing 30% colloidal silica was employed and the amount of boric expressed as boric acid was slightly more than half the amount of the silica. To 360 g. of the 30% silica solution, 37 g. of boric were added gradually with stirring, thus forming an aqueous system containing both silica and boria. Possibly the boria was in part absorbed on the surface of the colloidal silica particles. Possibly the system included both dissolved and absorbed boria.

To the silica boria mixture, 174 g. of alumina were added gradually with stirring, and 21 g. of zinc oxide were introduced. In this manner 592 g. of a paste of uniform consistency was prepared containing 108 g. of colloidal silica, 37 g. boria, 174 g. of alumina, 21 g. of zinc oxide (340 g. of solids) and 252 g. of water. In preparing such a paste, the metal oxides such as alumina and zinc oxide are in finely divided form and may be in the anhydrous, partially hydrated, or fully hydrated form inasmuch as the hydrated finely divided silica makes it possible to mix a uniform catalytic paste with any of such starting materials.

In a separate container, there was measured a sodium trisilicate solution which contained 3.22 parts of silica per part of sodium oxide, or about 8.5% sodium oxide, about 27.5% silica, and about 64% water, and a density designated as 38° Bé. (1.36 g./ml.). Some commercially available sodium trisilicate solutions corresponded exactly to such specifications, but some samples contained 65% water (35% solids) instead of 64% water, and some samples contained significant amounts of contaminants such as calcium oxide and aluminum oxide. Difficulties with such impurities can be avoided by employing a freshly prepared sample of sodium trisilicate resulting from the dispersion of fresh gelatinous silica in aqueous sodium hydroxide or by dispersing purified granular sodium trisilicate in deionized water.

The sodium trisilicate solution was heated during about 3 hours to evaporate water from the solution, and to increase the solids content from about 35% to above 40%. Thus, 750 g. of such concentrated silicate was prepared. In concentrating the solution, colloidal silicate was formed and dispersed within the concentrated sodium silicate solution.

The 592 g. of paste of boria, alumina, zinc oxide, colloidal silica and water was stirred into 750 g. of said concentrated sodium silicate to form 1342 g. of a composition, which was thoroughly mixed into 1500 g. of a liquid consisting of 900 g. of a 35% solution of a sodium trisilicate (3.22 ratio) and 600 g. of a 17.4% solution of pure sodium metasilicate (1.0 ratio). The 2842 grams of mixture were heated to evaporate sufficient water to concentrate the solution to a solids content of 40% to prepare a viscous liquid designated as a drawing composition. The mixture remains alkaline, i.e. at a pH above 7, during this concentration thereof. Data relating to this composition are set forth in Table 5.

TABLE 5

|  | H₂O | Na₂O | SiO₂ | B₂O₃ | ZnO | Al₂O₃ | Total |
|---|---|---|---|---|---|---|---|
| Colloidal Silica | 252 |  | 108 |  |  |  | 360 |
| Additives |  |  |  | 37 | 21 | 174 | 232 |
| Concentrated silicate | 450 | 71 | 229 |  |  |  | 750 |
| Trisilicate | 585 | 74 | 241 |  |  |  | 900 |
| Metasilicate | 496 | 52 | 52 |  |  |  | 600 |
| Before concentration | 1,783 | 197 | 630 | 37 | 21 | 174 | 2,842 |
| After concentration | 1,588 | 197 | 630 | 37 | 21 | 174 | 2,647 |
| Percent wet | 60 | 7.4 | 23.8 | 1.5 | 0.8 | 6.6 |  |

The viscous liquid resulting from the polymerization of the silicate can be used for any purpose for which aqueous dispersals of linear polysilicate fibril-type colloidal particles are useful such as in the protective coating, adhesive, and/or other industrial arts employing sodium silicate.

It should be noted that the combination of metallic anion such as borate with a metallic cation such as aluminum is particularly effective for catalyzing the linear polymerization. The polymerization is brought about by heating one portion of the alkaline silicate solution while evaporating water from a surface thereof.

During such concentration of the solution, the dehydration of the silicate aggregates to form larger aggregates occurs predominantly in a portion of the liquid near the surface of evaporation. This is accomplished by maintaining that portion of the body of the liquid at which heat is applied at a distance from and at a significantly higher temperature than the temperature of the surface of water removal, and thus a film of heated liquid can diffuse through the balance of the liquid toward the evaporative surface to form such larger aggregates. Such polymerization occurs linearly instead of globularly because of the catalytic effect of the hydroxyl ions, the sodium ions, the borate ions, the aluminum ions, and particularly the combination of all of the catalytic components.

In the manufacture of glass from fused siliceous systems, data has been accumulated relating to the relative attractiveness of various metal oxides as components for soda glasses. By a series of tests, it is established that the relative attractiveness of metal oxides as catalysts for linear polysilicates is approximately the same as the order of attractiveness of metal oxides as components for soda glasses. Thus boria and alumina (especially combinations thereof) are superior to tungstia. In the oxide-containing paste of the present invention, one or more of such various metal oxides, commonly known as "glass-forming oxides" or "hyalogenic" compounds, may be employed. The preferred glass-forming oxides are those selected from the group consisting of oxygen-containing compounds of the group consisting of compounds of boron, aluminum, zirconium, titanium, zinc, calcium, barium, arsenic, germanium, hafnium, phosphorous, vanadium, antimony, lead, thorium, beryllium, and tungsten.

Obviously various modifications of the illustrative example are possible without departing from the full scope of the invention as defined in the appended claims.

The invention claimed is:

1. The method of polymerizing alkaline silicates in an aqueous system to form an aqueous dispersion of linear polysilicate fibrils which includes the steps of evaporating water from an aqueous silicate solution to concentrate it to approximately 40% solids and to form colloidal silicate dispersed therein, said aqueous silicate solution containing the silicate of an alkali metal of the group consisting of sodium, potassium, and mixtures thereof, the ratio of alkali metal oxides in said aqueous silicate solution to the silica therein being within the range from 1:2 to 1:5, modifying the concentrated aqueous silicate solution by incorporating therein a catalytic paste prepared by adding to an aqueous solution of approximately 30% colloidal silica an amount of boria sufficient to catalyze the linear polymerization of said alkaline silicate and thereafter adding to the mixture of colloidal silica and boria, alumina and zinc oxide in approximate amounts of 174 parts Al₂O₃ and 21 parts ZnO to 108 parts SiO₂, applying heat to a body of the mixture of concentrated silicate solution and catalytic paste to evaporate water from the surface thereof, maintaining that portion of the body of said mixture at which heat is applied at a distance from and at a significantly higher temperature than the temperature of the surface of water evaporation to diffuse a film of heated liquid through the balance of the liquid toward the evaporative surface to form aggregates of material therein, maintaining said mixture at alkaline conditions above pH 7 during the evaporation of water from the mixture, continuing the heating of said body of mixture until the water evaporated therefrom is at least 10% of the initial water content and until the solids content of the remaining composition is increased to at least 40% by weight, whereby the alkaline silicate molecules polymerize under the influence of said catalytic paste and incorporate the oxygen-containing compounds of said paste in the polymer to form a predominant amount of amorphous, glass-like, non-crystalline fibrils having a molecular weight of at least 10,000, and whereby the solids in said system have an average molecular weight as measured by the light scattering method of at least 5,000.

2. A composition prepared in accordance with claim 1, and consisting of water containing at least 40% high molecular weight, predominantly over 10,000 molecular weight linear, amorphous, non-crystalline, glass-like alkaline silicate fibrils having the modifying content of boria and of at least one oxide selected from the group consisting of aluminum and zinc.

References Cited in the file of this patent

UNITED STATES PATENTS

| 2,509,026 | White | May 23, 1950 |
| 2,626,213 | Novak | Jan. 20, 1953 |
| 2,652,325 | Novak | Sept. 15, 1953 |